United States Patent
Suzuki et al.

(10) Patent No.: US 7,577,775 B2
(45) Date of Patent: Aug. 18, 2009

(54) STORAGE SYSTEM AND CONFIGURATION-CHANGE METHOD THEREOF

(75) Inventors: Hiroshi Suzuki, Sagamihara (JP); Tomokazu Yokoyama, Fujisawa (JP); Masato Ogawa, Chigasaki (JP); Tetsuya Inoue, Odawara (JP); Hiromi Matsushige, Hiratsuka (JP); Masateru Kurokawa, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 200 days.

(21) Appl. No.: 11/477,447

(22) Filed: Jun. 30, 2006

(65) Prior Publication Data

US 2008/0005396 A1    Jan. 3, 2008

(30) Foreign Application Priority Data

May 16, 2006    (JP)    ............................. 2006-136486

(51) Int. Cl.
*G06F 3/00* (2006.01)
*G06F 13/42* (2006.01)
*G06F 13/00* (2006.01)
*G06F 11/00* (2006.01)

(52) U.S. Cl. ......................... 710/38; 340/825; 711/114; 714/7

(58) Field of Classification Search ...................... None
See application file for complete search history.

(56) References Cited

U.S. PATENT DOCUMENTS 6,118,776 A *    9/2000    Berman ....................... 370/351
6,393,535 B1 *   5/2002    Burton et al. ................ 711/158
7,107,421 B2 *   9/2006    Kaneda et al. .............. 711/162

FOREIGN PATENT DOCUMENTS

JP    06-232813    8/1994

* cited by examiner

*Primary Examiner*—Henry W. H. Tsai
*Assistant Examiner*—Michael Sun
(74) *Attorney, Agent, or Firm*—Brundidge & Stanger, P.C.

(57) ABSTRACT

A storage system includes a plurality of disk drives, one or more controller boards for controlling data read and write from/to the plurality of disk drives, and a Fibre Channel switching board for controlling path switching between the controller boards and the plurality of disk drives. The Fibre Channel switching board has a control logical circuit for adjusting a control signal system between the controller boards and the disk drives according to a connection confirmation signal indicating whether or not the control signal cable is connected to the Fibre Channel switching board.

8 Claims, 11 Drawing Sheets

FIG.10

CONTROL LOGICAL TRUE VALUE TABLE

| | | | CONNECT SIGNAL 2 | |
|---|---|---|---|---|
| | | | Low(CONNECTED) | High(NOT CONNECTED) |
| CONNECT SIGNAL 1 | Low (CONNECTED) | EN1 | H | H |
| | | EN2 | L | H |
| | | EN3 | H | L |
| | High (NOT CONNECTED) | EN1 | L | |
| | | EN2 | L | |
| | | EN3 | L | |
| | | | HIGH PERFORMANCE | STANDARD |

STORAGE SYSTEM AND CONFIGURATION-CHANGE METHOD THEREOF

CROSS-REFERENCES TO RELATED APPLICATIONS

This application relates to and claims priority from Japanese Patent Application No. 2006-136486, filed on May 16, 2006, the entire disclosure of which is incorporated herein by reference.

BACKGROUND

The present invention relates to a storage system and its configuration-change method.

A disk array apparatus includes a plurality of disk drives arranged in arrays and provides a host computer with a logical storage area in a RAID (Redundant Array of Independent Inexpensive Disks) configuration. At least one logical unit is formed in a physical storage area provided by the plurality of disk drives and is provided to a host computer. The host computer can read and write access the logical unit.

A disk array apparatus includes a disk drive for storing data and a disk controller for controlling data read/write from/to the disk drive. The disk controller has one or more controller boards having a microprocessor for controlling data transfer. A Fibre Channel interface is a common interface for connection between the controller boards and disk drive. The Fibre Channel interface is a serial interface, and is now being standardized by the ANSI X3T11 Committee.

An optical fiber line switch, such as a Fibre Channel switch, is used as a device for controlling connection switching between Fibre Channel cables for transmitting data stored in a disk drive and the plurality of disk drives.

JP-A6-232813 discloses an optical fiber line switch.

SUMMARY

While the performance of disk array apparatuses is being developed and their capacities are becoming larger now, the ability to freely change the system configuration of the disk array apparatus according to the intended use is required. Moreover, the ability to change a system configuration while without disrupting disk drive operation or affecting reliability is needed.

Conventionally, a dedicated Fibre Channel switching board is used in each model, and changing the Fibre Channel switching board is necessary when changing the storage system configuration. Sometimes a Fibre Channel switching board dedicated for a different model is inserted by mistake, causing a failure. Moreover, the disk drive operation has to be temporarily stopped when changing a Fibre Channel switching board, and so the system configuration could not be changed without disrupting operating the disk drives.

An object of the present invention to provide a storage system and a configuration-change method for the storage system with which a system configuration can be changed without disrupting operating disk drives or affecting any reliability.

To achieve the above stated object, a storage system according to the present invention includes a plurality of disk drives, one or more controller boards for controlling data write/read to/from the plurality of disk drives, one or more Fibre Channel switching board for controlling path switching between the controller boards and the plurality of disk drives, and one or more control signal cables for connection between the controller boards and the Fibre Channel switching board. The Fibre Channel switching board has a control logical circuit for adjusting the control signal system between the controller boards and the disk drives according to a connection confirmation signal indicating whether or not the control signal cables are connected to the Fibre Channel switching board.

The control logical circuit adjusts the control signal system between the controller board and the disk drives according to the combination of connections between the one or more controller boards and the one or more Fibre Channel switching boards.

The control logical circuit may set whether one of the controller boards or a plurality of the controller boards controls the plurality of the disk drives according to the combination of the connection between the one or more controller boards and the one or more Fibre Channel switching boards.

A storage system configuration change method according to the present invention is a method for changing the configuration of a storage system including a plurality of disk drives, one or more controller boards for controlling data read and write from/to the plurality of the disk drives, and a Fibre Channel switching board for controlling path switching between the controller boards and the plurality of the disk drives. In the storage system configuration change method, the controller boards are connected to the Fibre Channel switching board via a control signal cable, and a control signal system between the controller boards and disk drives is adjusted according to a connection confirmation signal indicating whether or not the control signal cable is connected to the Fibre Channel switching board.

According to the present invention, the storage system configuration can be changed without disrupting operating disk drives or affecting reliability.

BRIEF DESCRIPTION OF THE DRAWINGS

FIG. 10 is a diagram illustrating a true value table for a control logical circuit.

DETAILED DESCRIPTION OF PREFERRED EMBODIMENTS

Figure 1:
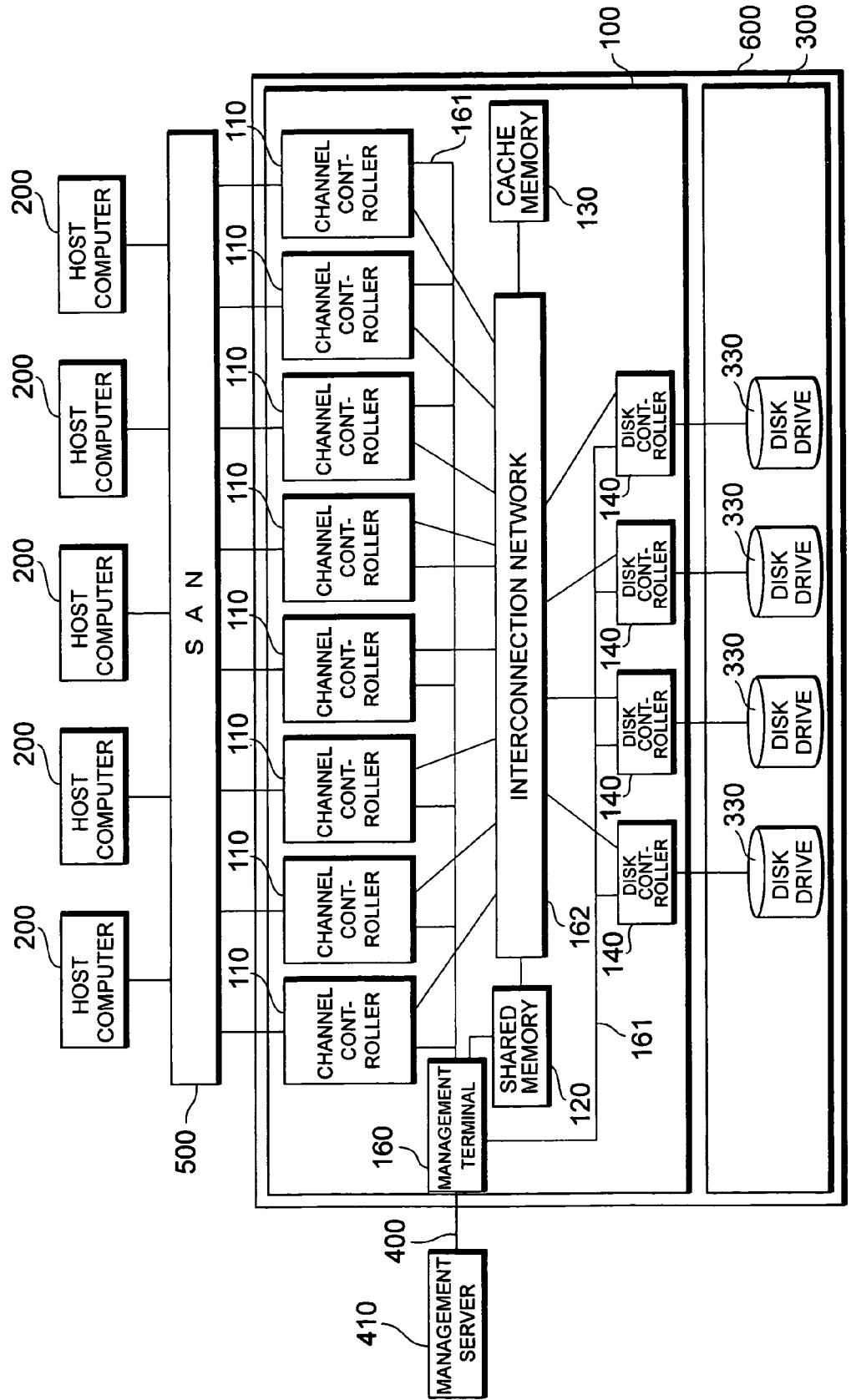
FIG. 1 is a hardware configuration diagram showing a storage system according to embodiments in the present invention.

Embodiments of the present invention will be hereinafter described with reference to the drawings. FIG. 1 shows a hardware configuration in a storage system 600 according to the embodiments in the present invention. The storage system 600 is mainly made up with a storage controller 100 and a storage device 300. The storage controller 100, for example, performs data input/output control to/from the storage device 300 in response to a command received from a host computer 200. The storage controller 100 also performs various processing including setting and change in configuration information of the storage system 600 in response to a command received from a management server 410.

The host computer 200 is a host device such as a personal computer, workstation, or mainframe computer, etc. The host computer 200 is connected to be able to communicate with the storage controller 100 via a SAN 500. The SAN 500 is a storage network for transmitting and receiving data to/from the host computer 200 in blocks, which are data management units for storage resources provided by the storage device 300. A communication protocol used in the communication between the host computer 200 and the storage controller 100 via the SAN 500 is, for example, Fibre Channel Protocol.

The host computer 200 may not necessarily be connected to the storage controller 100 via the SAN 500. They may be connected with each other via a LAN (Local Area Network), or may be directly connected, not via any network. If the host computer 200 and the storage controller 100 are connected mutually via a LAN, communication can be performed according to, for example, TCP/IP (Transmission Control Protocol/Internet Protocol). If the host computer 200 is directly connected to the storage controller 100 not via any network, communication may be performed according to a communication protocol such as FICON (Fibre Connection) (registered trademark), ESCON (Enterprise System Connection) (registered trademark), ACONARK (Advanced Connection Architecture) (registered trademark), or FIBARC (Fibre Connection Architecture) (registered trademark), etc.

The management server 410 is connected, via an external LAN 400, to a management terminal 160. The external LAN 400 is the Internet or a dedicated line, etc. Communication between the management server 410 and the management terminal 160 via the external LAN 400 is performed according to a communication protocol such as TCP/IP.

The storage device 300 includes a plurality of disk drives 330. Each disk drive 330 is a hard disk drive such as an ATA (Advanced Technology Attachment) disk drive, SCSI (Small Computer System Interface) disk drive, or a Fibre Channel disk drive, etc. RAID (Redundant Arrays of Inexpensive Disks) configuration can be formed from a plurality of arrayed disk drives 330. A logical device can be defined in a physical volume, which is a physical storage area provided by the disk drive 330. The storage controller 100 and the storage device 300 may be directly connected to each other not via a network, or may be connected via a network. Alternatively, the storage device 300 and the storage controller 100 may be integrated into a single unit.

The storage controller 100 includes a channel controller 110, shared memory 120, cache memory 130, disk controller 140, management terminal 160, and interconnection network 162.

The storage controller 100 communicates with the host computer 200 through the channel controller 110, via the SAN 500. The channel controller 110 transmits and receives data input/output commands to/from the host computer 200. Each channel controller 110 is connected to a management terminal 160 via an internal LAN (shared bus) 161. With that configuration, a microprogram and the like executed by the channel controller 110 can be installed from the management terminal 160.

The interconnection network 162 mutually connects the channel controller 110, shared memory 120, cache memory 130, disk controller 140, and management terminal 160. Data and commands are transmitted or received, via the interconnection network 162, between the channel controller 110, shared memory 120, cache memory 130, disk controller 140, and management terminal 160. The interconnection network 162 is, for example, a cross bus switch.

The shared memory 120 and cache memory 130 are memory devices shared by the channel controller 110 and the disk controller 140. The shared memory 120 is used mainly for storing resource configuration information and various commands, and the like. The cache memory 130 is used mainly for temporarily storing data that is to be written to or read from the disk drives 330.

For example, if a data input/output request received by the channel controller 110 from the host computer 200 is a write command, the channel controller 110 writes the write command to the shared memory 120 and the write data received from the host computer 200 to the cache memory 130.

The disk controller 140 always monitors the shared memory 120. The disk controller 140, detecting that the write command has been written to the shared memory 120, reads dirty data from the cache memory 130 and destages that data to the physical disk drive 300 according to the command.

If a data input/output request received by the channel controller 110 from the host computer 200 is a read command, whether or not the data that is to be read exists in the cache memory 130 is checked. If the read data exists in the cache memory 130, the channel controller 110 reads that data from the cache memory 130 and transmits it to the host computer 200.

Meanwhile, if the read data does not exist in the cache memory 130, the channel controller 110 writes the read command to the shared memory 120. The disk controller 140 always monitors the shared memory 120. The disk controller 140, detecting that the read command has been written to the shared memory 120, reads data that is to be read from the storage device 300, writes the data to the cache memory 130, and writes, to the shared memory 120, that the data has been written to the cache memory 130. After that, the channel controller 110, detecting that the read data has been written to the cache memory 130, reads the data from the cache memory 130 and transmits it to the host computer 200.

Data transmission and reception are performed between the channel controller 110 and the disk controller 140 via the cache memory 130 in the above described manner. Among data stored in the disk drives, the data read or written by the channel controller 110 or the disk controller 140 is temporarily written to the cache memory 130.

The disk controller 140 is connected to the plurality of the disk drives 330 for storing data to be able to perform mutual communication, and controls the storage device 300. For example, the channel controller 110 writes or reads data to/from the disk drives 330 in response to a data input/output request received by the channel controller 110 from the host computer 220.

Each disk controller 140 is connected to the management terminal 160 via the internal LAN 161 to be able to perform mutual communication. With that configuration, a microprogram and the like executed by the disk controller 140 can be transmitted from the management terminal 160 and installed to the disk controller 140.

The management terminal 160 is a computer for managing the storage system 600. A system administrator can set the configuration for the disk drives 330, set a path between the host computer 200 and the channel controller 110, and install microprograms executed by the channel controller 110 or the disk controller 140. Setting of the disk drive 330 configuration involves either an increase or decrease in the number of the disk drives 330 or a change of the RAID format (e.g. change from RAID 1 to RAID 5). The management terminal 160 can also confirm the operation status of the storage system 600, specify a malfunctioning part, and install an operating system executed by the channel controller 110. Those various settings and control can be performed through a user interface included in the management terminal 160.

Figure 2:
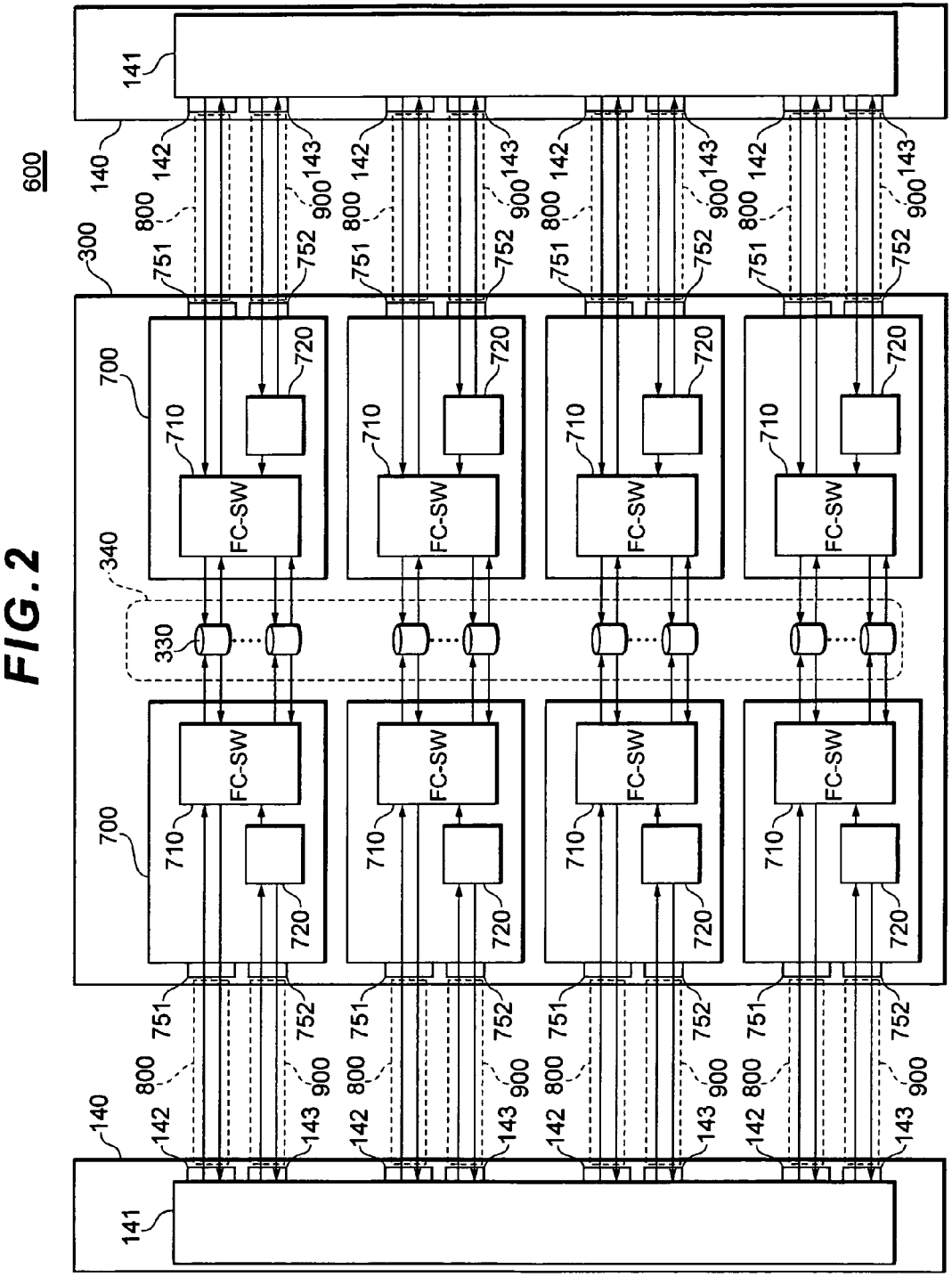
FIG. 2 is a system configuration diagram showing back interfaces for disk drives.

FIG. 2 is a system configuration diagram showing back interfaces for the disk drives 330. The disk controller 140 is connected to the storage device 300 via a Fibre Channel cable 800 and a control signal cable 900. The disk controller 140 has one or more controller boards 141 for controlling the Fibre Channel interface. Each controller board 141 has a port 142 for connection with the Fibre Channel cable 800 and a port 143 for connection with the control signal cable 900.

The storage device 300 includes the plurality of the disk drives 330 for forming a RAID group 340, and a plurality of Fibre Channel switching boards 700 for controlling connection switching between the Fibre Channel cables 800 and the disk drives 330. The RAID group 340 is established by, for example, grouping four disk drives 330 into one unit (3D+1P), or eight disk drives 330 into one unit (7D+1P). In other words, the RAID group 340 is formed by gathering storage areas provided by the plurality of the disk drives 330.

Each Fibre Channel switching board 700 includes a port 751 for connection with the Fibre Channel cable 800, a port 752 for connection with the control signal cable 900, a Fibre Channel switch 710 for controlling connection switching between the Fibre Channel cable 800 and the disk drives 330, and a control circuit 720 for controlling the Fibre Channel switch 710. The control circuit 720 controls the Fibre Channel switch 710 according to a control signal transmitted from the controller board 141 via the control signal cable 900.

Next, the configuration change in the storage system 600 will be described with reference to FIGS. 3 to 5.

Figure 3:
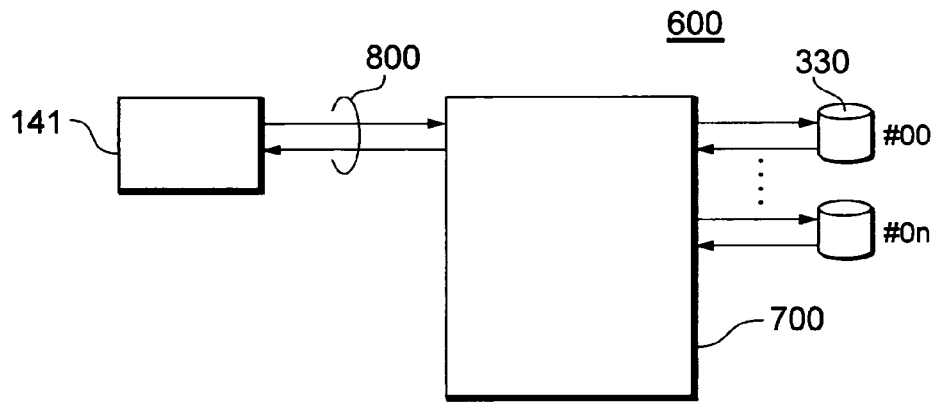
FIG. 3 is a diagram illustrating a schematic configuration for a basic model.

FIG. 3 is the storage system 600 of a basic model. The controller board 141 controls data write and read to/from each of (n+1) disk drives 330 (each of the disk drives 330 numbered #00 to #0n) connected to the Fibre Channel switching board 700. The Fibre Channel switching board 700 switches connection of the Fibre Channel cable 800 to an access target disk drive 330 according to a command from the controller board 141.

Figure 4:
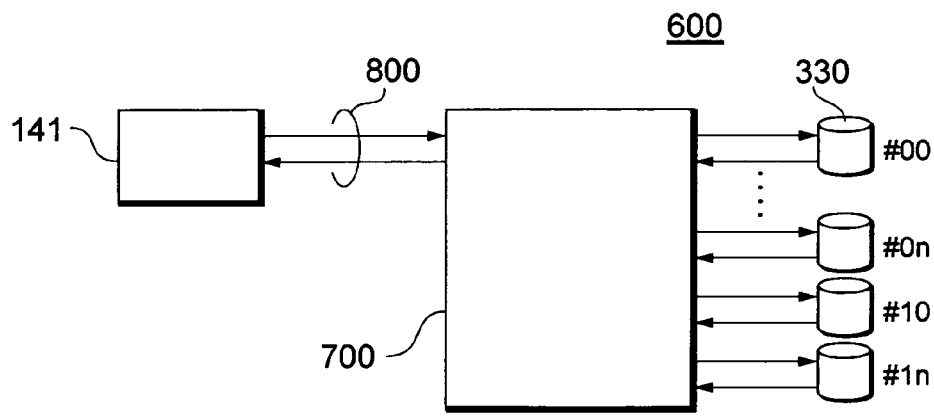
FIG. 4 is a diagram illustrating a schematic configuration for a standard model.

FIG. 4 is the standard model of the storage system 600. The controller board 141 controls data write and read to/from each of 2(n+1) disk drives 330 (each of the disk drives 330 numbered #00 to #0n and number #10 to #1n) connected to the Fibre Channel switching board 700. The standard model has a system configuration aiming for realizing the storage system 600 that provides a large volume of storage resources for the host computer at low cost. By further adding a plurality of disk drives 330 to the basic mode storage system 600, the system configuration of the storage system 600 can be changed to the standard model. Because the storage system 600 has to receive a data access from a host computer at any time, the change from the basic mode to the standard model is performed by adding new disk drives 330 (#10 the #1n) without disrupting operating the disk drives 330 (#00 to #0n) that has been already connected to the Fibre Channel switching board 700.

However, if the number of disk drives 330 controlled by the single controller board 141 exceeds a certain fixed number, the burden on the controller board 141 becomes too much and data transfer speed decreases. In a high performance model described below, the burden on each controller 141 is reduced and the data transfer speed is increased by allocating control of the disk drives 330 to the plurality of the controllers.

Figure 5:
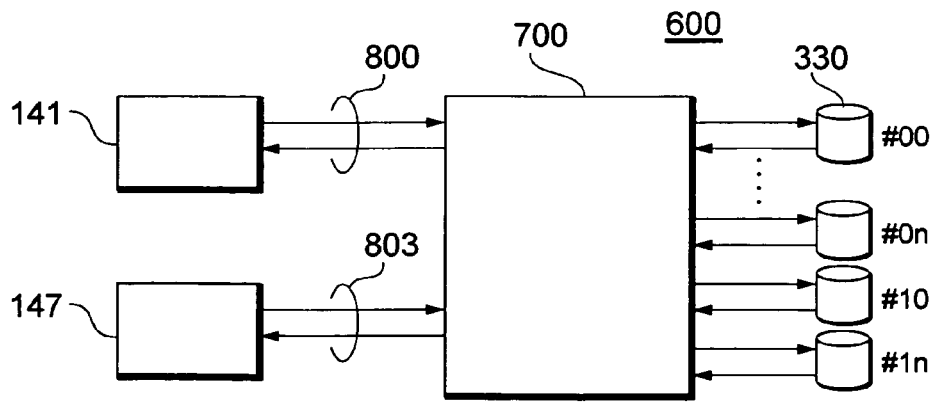
FIG. 5 is a diagram illustrating a schematic configuration for a high performance model.

FIG. 5 shows the high performance model of the storage system 600. In the high performance model, plural controller boards 141 and 147 share processing for controlling the disk drives 330. The burden can be thus dispersed. The controller board 141 is assigned to the control of the disk drives 330 numbered #00 to #0n, and the controller board 147 is assigned to the control of the disk drives 330 numbered #10 to #1n. The high performance model has a system configuration aiming for increasing data transfer speed.

Next, the specific configuration of the Fibre Channel switching board 700 according to the present embodiment will be further described with reference to FIGS. 6 to 10. Devices provided with the reference numerals identical to those shown in FIG. 2 represent the same devices, and the further explanation will be omitted.

Figure 6:
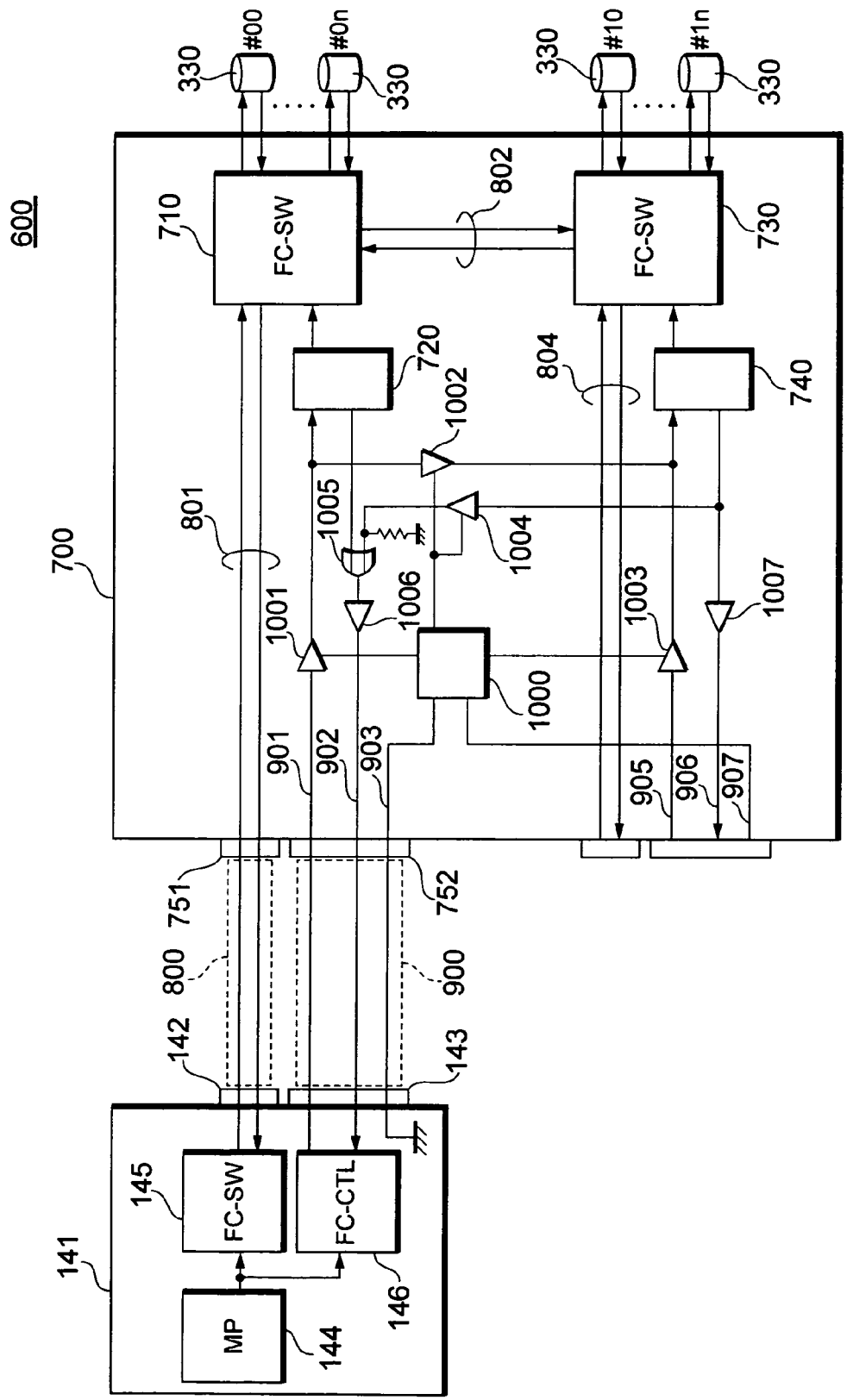
FIG. 6 is a diagram illustrating a specific configuration for the standard model.

FIG. 6 shows a system configuration of the standard model storage system 600. In the standard model, the single controller board 141 controls data accesses to each of 2(n+1) disk drives 330 (each of the disk drives 330 numbered #00-#0n and #10-#1n).

The controller board 141 includes a Fibre Channel switch 145 for controlling connection switching of the Fibre Channel cable 800, a Fibre Channel controller 146 for transmitting a control signal via the control signal cable 900, and a microprocessor 144 for controlling the Fibre Channel switch 145 and the Fibre Channel controller 146.

The Fibre Channel cable 800 includes a signal line 801. The control signal cable 900 includes control signal lines 901 and 902 and a connect signal line 903.

The Fibre Channel switching board 700 has a plurality of Fibre Channel switches 710 and 730, a plurality of control circuits 720 and 740, control signal lines 901, 902, 905, and 906, connect signal lines 903 and 907, a control logical circuit 1000, tristate buffers 1001 to 1004, an OR circuit 1005, buffers 1006 and 1007, and a plurality of ports 751 to 754.

The port 751 is connected to the Fibre Channel cable 800, which extends from the controller board 141. The port 752 is connected to the control signal cable 900 which extends from the controller board 141. The port 753 is connected to the Fibre Channel cable 803 extended from the controller board 147 described later (see FIG. 7). The port 754 is connected to the control signal line 904 extended from the controller board 147 described later (see FIG. 7). The Fibre Channel switch 710 and the Fibre Channel switch 730 are mutually connected via the signal line 802.

In the standard model, the control circuit 720 controls the Fibre Channel switch 710 according to a control signal transmitted via the control signal lines 901 and 902, and the control circuit 740 controls the Fibre Channel switch 730 according to a control signal transmitted via the control signal lines 901 and 902.

In the standard model, the controller board 141 can access the disk drives 330 numbered #00 to #0n via the Fibre Channel switch 710, and access the disk drives 330 numbered #10 to #1n via the Fibre Channel switch 710, the signal line 802, and the Fibre Channel switch 730.

The control logical circuit 1000 controls the tristate buffers 1001 to 1004 according to the combination of logical values of connection confirmation signals output from the connect signal lines 903 and 907. The "connect confirmation signal" is a signal for detecting whether or not the Fibre Channel cable 800 is connected to the port 751 and whether or not the Fibre Channel cable 803 is connected to the port 753. In the present embodiment, if the control signal cable 900 is connected to the port 752, the connection confirmation signal output from the connect signal line 903 has a low level signal potential. If the control signal cable 900 is not connected to the port 752, the connection confirmation signal output from the connect signal line 903 has a high-level signal potential. The same applies to connection confirmation signals output from the connect signal line 904.

In the standard model, the signal potential output from the connect signal line 903 is at low level, while the signal potential output from the connect signal line 907 is at high level. Therefore, enable signals input to the tristate buffers 1001, 1002 and 1004 are at high level, while an enable signal input to the tristate buffer 1003 is at low level. Accordingly, those tristate buffers 1001, 1002, and 1004 are in the low impedance state, and the tristate buffer 1003 is in the high impedance state. In other words, the control circuits 720 and 740 are connected to an external circuit (controller board 141) via the control signal lines 901 and 902, and the control circuits 720 and 740 are separate from an external circuit (controller board 147 described later).

Figure 7:
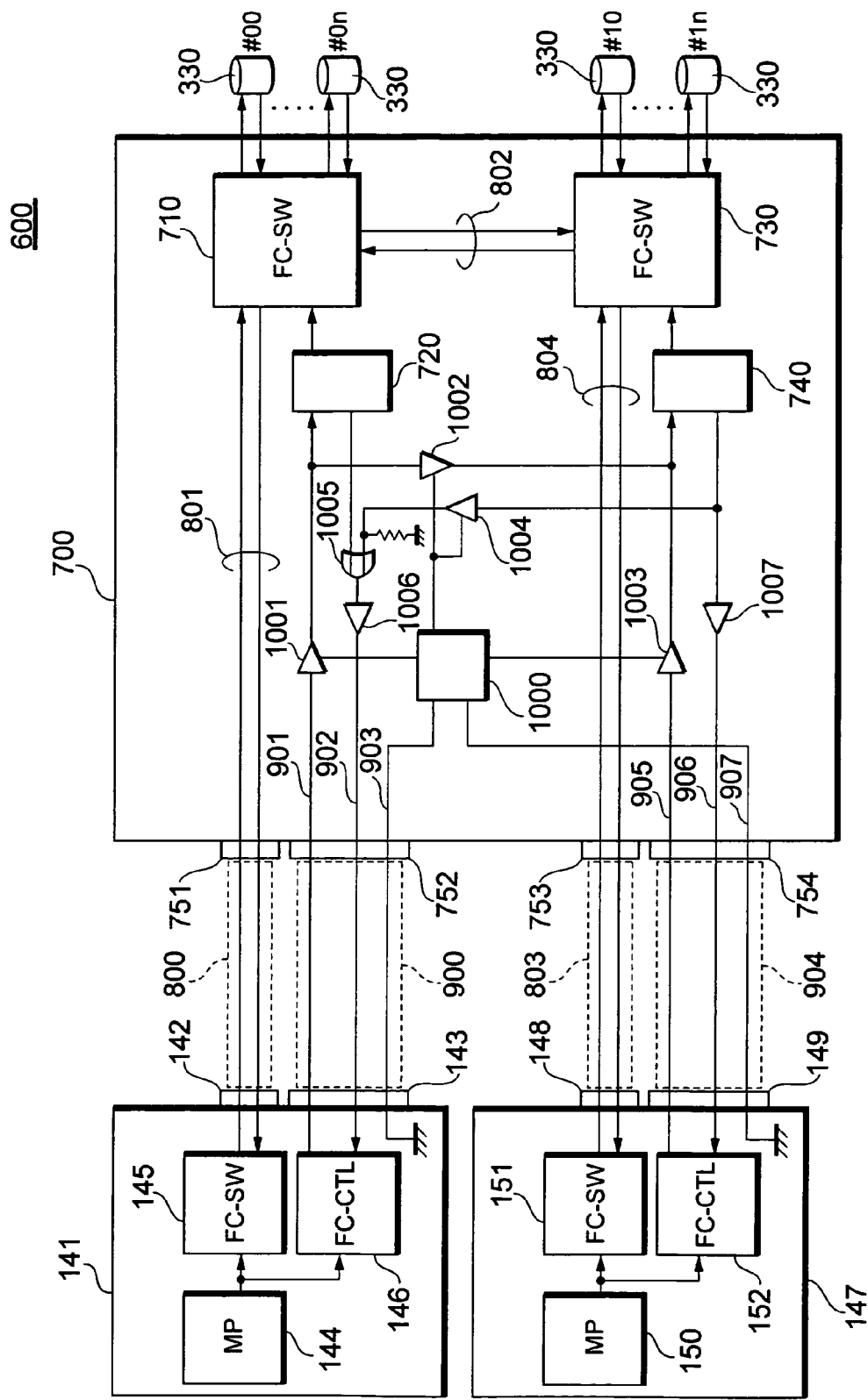
FIG. 7 is a diagram illustrating a specific configuration for the high performance model.

FIG. 7 shows a system configuration of the high performance model storage system 600. In the high performance model, the controller board 141 controls data access to each of (n+1) disk drives 330 (each of the disk drives 330 numbered #00 to #0n), and the controller board 147 controls data access to each of (n+1) disk drives (each of disk drives 330 numbered #10 to #1n).

The controller board 147 includes a Fibre Channel switch 151 for controlling connection switching of the Fibre Channel cable 803, a Fibre Channel controller 152 for transmitting a control signal via the control signal cable 904, and a microprocessor 150 for controlling the Fibre Channel switch 151 and the Fibre Channel controller 152.

The Fibre Channel cable 803 includes a signal line 804. The control signal cable 904 includes control signal lines 905 and 906 and a connect signal line 907.

In the high performance model, the control circuit 720 controls the Fibre Channel switch 710 according to a control signal transmitted via the control signal lines 901 and 902, and the control circuit 740 controls the Fibre Channel switch 730 according to a control signal transmitted via the control signal lines 905 and 906.

In the high performance model, the controller board 141 accesses the disk drives 330 numbered #00 to #0n via the Fibre Channel switch 710, and the controller board 147 accesses the disk drives 330 numbered #10 to #1n via the Fibre Channel switch 730.

In the high performance model, the signal potential output from the connect signal lines 903 and 907 is at low level. Therefore, enable signals input to the tristate buffers 1001 and 1003 are at high level, and enable signals input to the tristate buffers 1002 and 1004 are at low level. Therefore, the tristate buffers 1001 and 1003 are in the low impedance state, and the tristate buffers 1002 and 1004 are in the high impedance state.

In other words, the control circuit 720 is connected to an external circuit (the controller board 141) via the control signal lines 901 and 902, and the control circuit 740 is connected to an external circuit (the controller board 147) via the control signal lines 905 and 906.

Next, the details of the control logical circuit 1000 for controlling the tristate buffers 1001 to 1004 according to a connection confirmation signal output from the connect signal lines 903 and 907 will be described with reference to FIGS. 8 to 10.

The control logical circuit 1000 controls diodes 1020 and 1030, which have been pulled up to the voltage Vcc, inverters 1041 and 1043, and a buffer 1042. The control logical circuit 1000 controls the tristate buffers 1001 to 1004 based on a true value table shown in FIG. 10.

Figure 8:
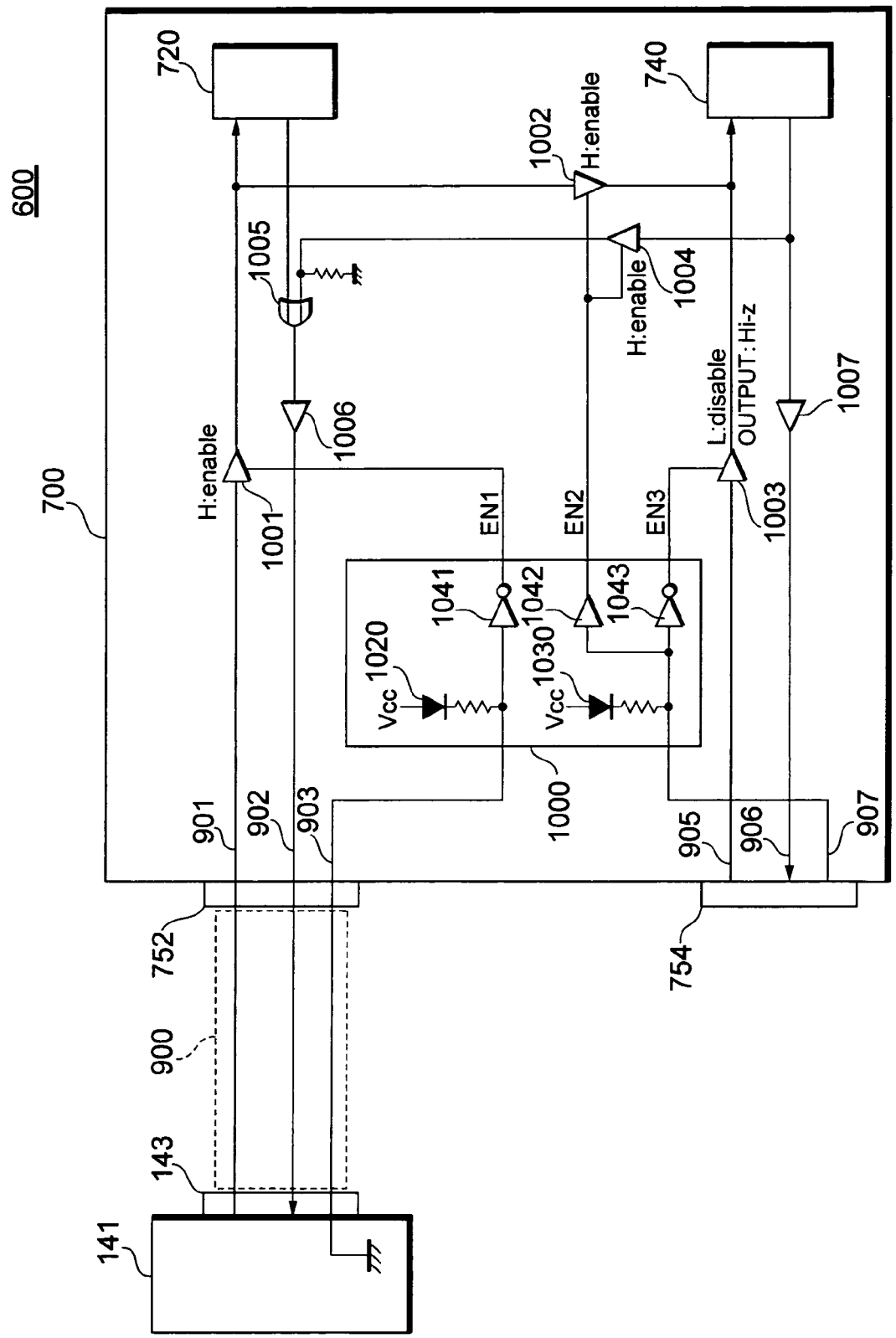
FIG. 8 is a diagram illustrating a specific configuration for a control system in the standard model.

In the standard model, as shown in FIG. 8, the signal potential output from the connect signal line 903 is at low level, and that output from the connect signal line 907 is at high level. Because an output potential EN1 of the inverter 1041 is at high level, the tristate buffer 1001 is in the low impedance state. Because an output potential EN2 of the buffer 1042 is at high level, the tristate buffer 1002 is in the low impedance state. Because an output potential EN3 of the inverter 1043 is at low level, the tristate buffer 1003 is in the high impedance state.

Figure 9:
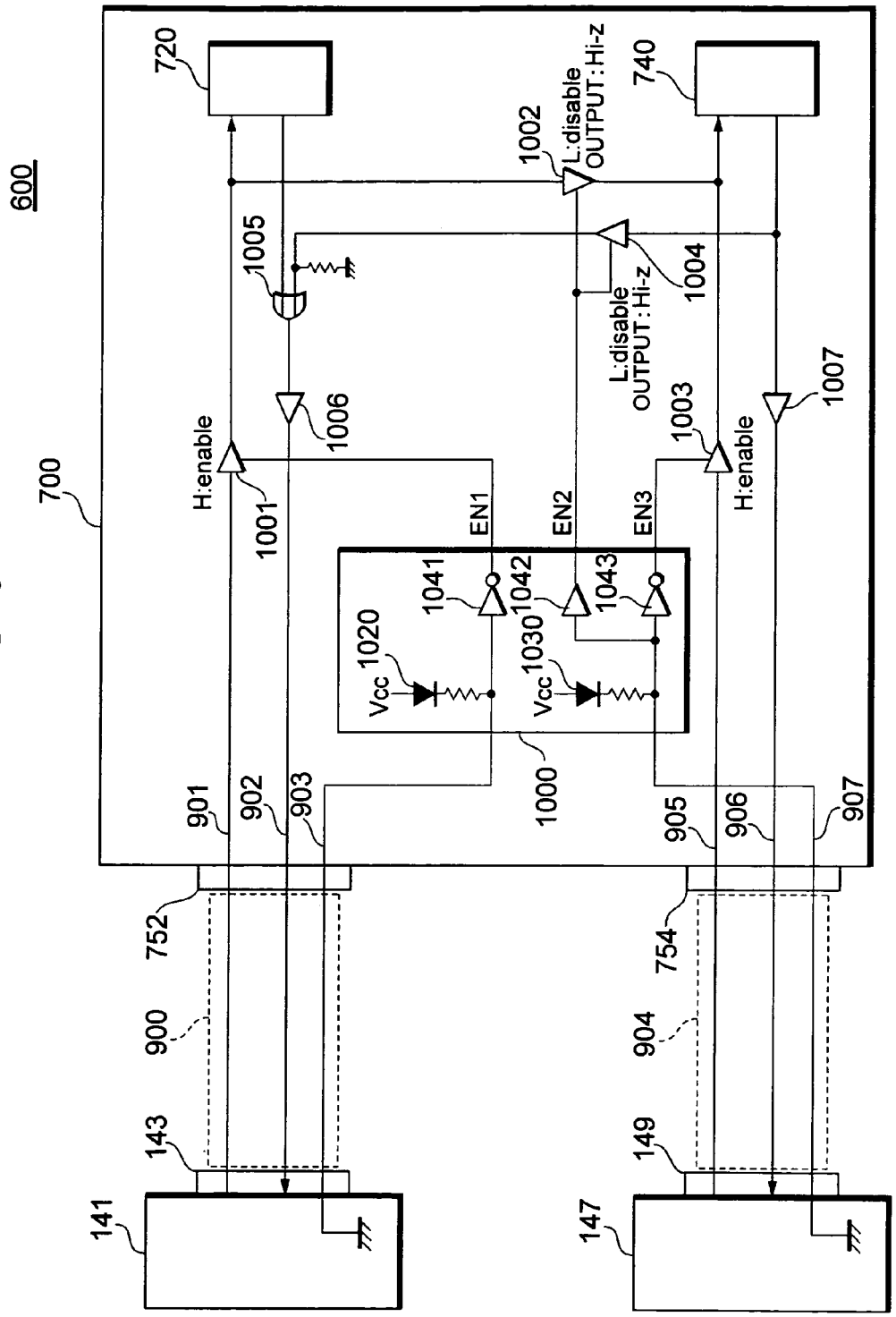
FIG. 9 is a diagram illustrating a specific configuration for a control system in the high performance model.

In the high performance model, as shown in FIG. 9, the signal potential output from the connect signal lines 903 and 907 is at low level. Because an output potential EN1 of the inverter 1041 is at high level, the tristate buffer 1001 is in the low impedance state. Because an output potential EN2 of the buffer 1042 is at low level, the tristate buffer 1002 is in the high impedance. Because an output potential EN3 of the inverter 1043 is at high level, the tristate buffer 1003 is in the low impedance state.

As described above, the control logical circuit 1000 adjusts the control signal system (the signal system including the control signal lines 901, 902, 905, and 906 and the control circuits 720 and 740) between the controller boards 141 and 147 and the disk drives 330 in accordance with the combination of the connections between the plural controller boards 141 and 147 and the one or more Fibre Channel switching boards.

The procedure for changing from the standard model to the high performance model will be described below. (1) The management terminal 160 that manages the configuration information of the storage system 600 changes the controller board assigned to control the disk drives numbered #10 to #1n from the controller board 141 to the controller board 147. (2) The controller board 147 is connected to the Fibre Channel switching board 700 while the disk drives numbered #00 to #0n are in operation. (3) The control circuit 720 configures settings for the Fibre Channel switch 710 to set the access target of the controller board 141 to the disk drives 330 numbered #00-#0n. (4) The control circuit 730 configures settings for the Fibre Channel switch 730 to set the access target of the controller board 147 to the disk drives 330 numbered #10-#1n.

Next, various configurations of the storage system 600 will be described with reference to FIGS. 11 to 16.

Figure 11:
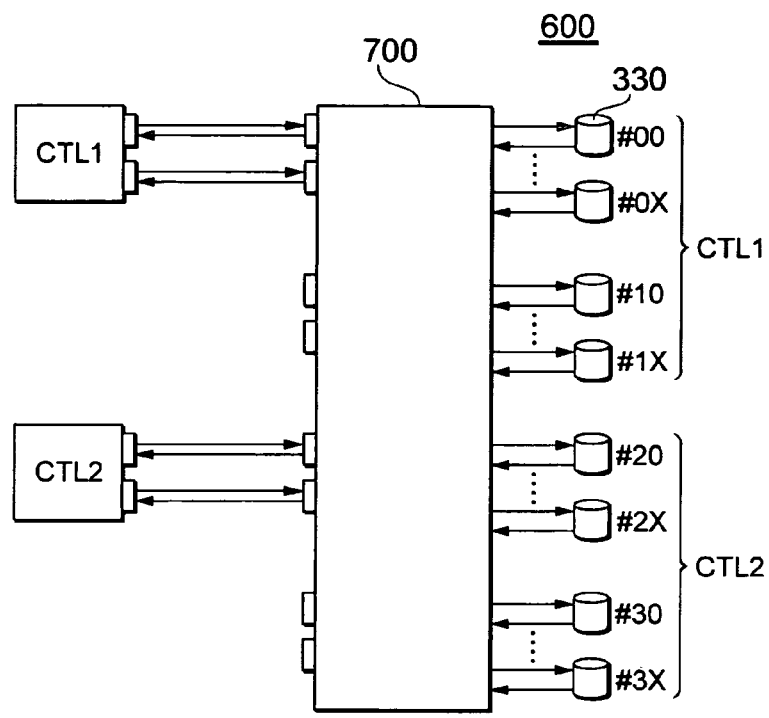
FIG. 11 is a diagram illustrating an example of a storage system.

FIG. 11 shows the modified example 1 of the standard model. The controller board CTL1 is assigned to control the disk drives 330 numbered #00 to #0x and #10 to #0x according to the system configuration of the standard model. The controller board CTL2 is assigned to control the disk drives numbered #20-#2n and #30-#3x according to the system configuration in the standard model.

Figure 12:
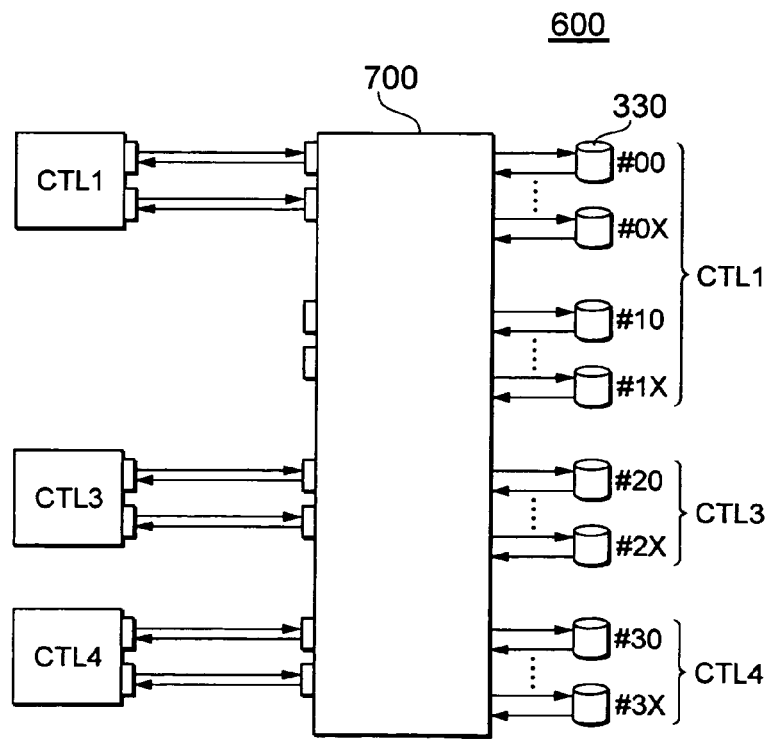
FIG. 12 is a diagram illustrating an example of a storage system.

FIG. 12 shows the combined example 1, wherein the standard model and high performance model are combined. The controller board CTL1 is assigned to control the disk drives 330 numbered #00 to #0x and #10 to #1x according to the system configuration in the standard model. The controller board CTL3 is assigned to control the disk drives 330 numbered #20-#2x according to the system configuration in the high performance model. The controller board CTL4 is assigned to control the disk drives 330 numbered #30-#3x according to the system configuration in the high performance model.

Figure 13:
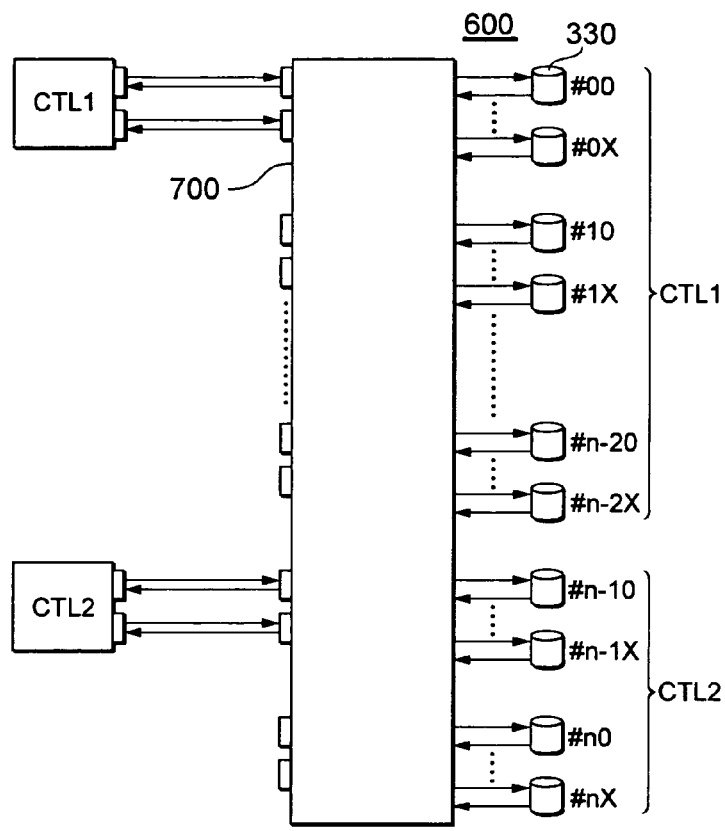
FIG. 13 is a diagram illustrating an example of a storage system.

FIG. 13 shows the modified example 2 of the standard model. The controller board CTL1 controls the disk drives 330 numbered #00 to #0x, #10 to #1x, and #n-20 to #n-2x according to the system configuration in the standard model. The controller board CTL2 controls the disk drives numbered #20 to #2x and #30 to #3x according to the system configuration in the standard model.

Figure 14:
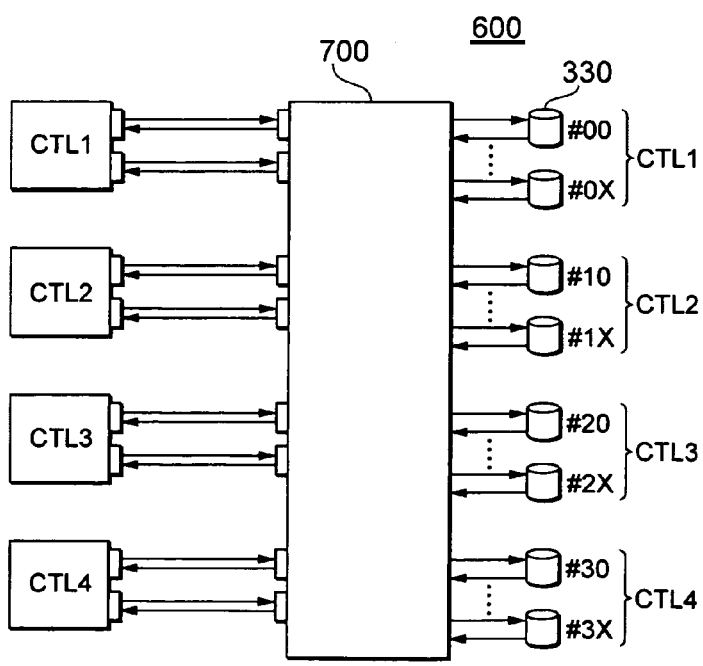
FIG. 14 is a diagram illustrating an example of a storage system.

FIG. 14 shows the modified example 1 of the high performance model. The controller board CTL1 is assigned to control the disk drives 330 numbered #00 to #0x according to the system configuration in the high performance model. The controller board CTL2 is assigned to control the disk drives numbered #10 to #1x according to the system configuration in the high performance model. The controller board CTL3 is assigned to control the disk drives 330 numbered #20 to #2x according to the system configuration in the high performance model. The controller board CTL4 is assigned to control the disk drives 330 numbered #30 to #3x according to the system configuration in the high performance model.

Figure 15:
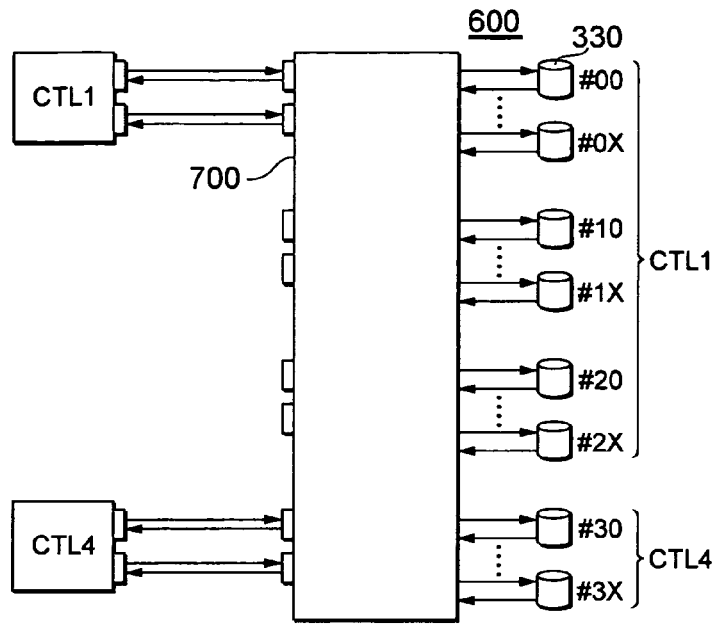
FIG. 15 is a diagram illustrating an example of a storage system.

FIG. 15 shows the combined example 2, wherein the standard model and high performance model are combined. The controller board CTL1 is assigned to control the disk drives 330 numbered #00 to #0x, #10 to #1x, and #20 to #2x according to the system configuration in the standard model. The controller board CTL4 is assigned to control the disk drives 330 of number #30 to #3n according to the system configuration of the high performance model.

Figure 16:
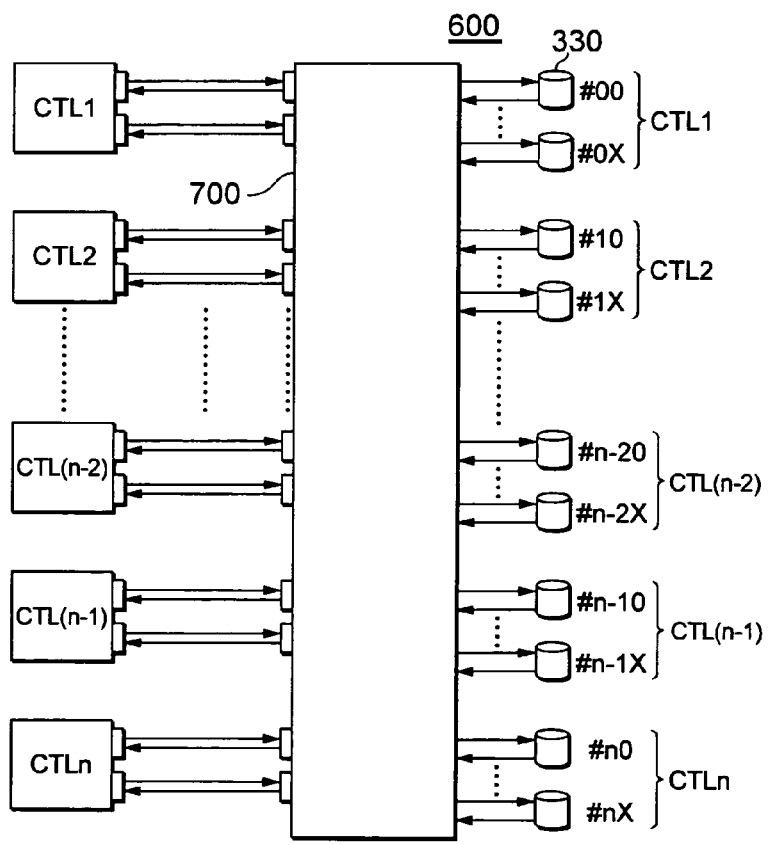
FIG. 16 is a diagram illustrating an example of a storage system.

FIG. 16 shows the modified example 2 of the high performance model. The controller board CTL1 is assigned to control the disk drives numbered #10 to #1x according to the system configuration in the high performance model. The controller board CTL2 is assigned to control the disk drives 330 numbered #10 to #1x according to the system configuration in the high performance model. The controller board CTL(n-2) is assigned to control the disk drives 330 numbered #n-20 to #n-2x according to the system configuration in the high performance model. The controller board CTL(n-1) is assigned to control the disk drives 330 numbered #n-10x to #n-1x according to the system configuration in the high performance model. The controller board CTLn is assigned to control the disk drives 330 numbered #n0x with #nx according to the system configuration in the high performance model.

According to the Fibre Channel switching board 700 in the present embodiment, the configuration change in the storage system 600 is performed based on the signal potential output from the connect signal lines 903 and 907 indicating the connections of the controller boards 141 and 147. Accordingly, the system configuration can be changed without disrupting operating the disk drives 330. Moreover, because the Fibre Channel switching board 700 does not have to be replaced, the system configuration can be changed without affecting the reliability.

Moreover, because the path can be switched by the microprocessor that controls HDD accesses, failures do not occur in paths in use. Furthermore, because the Fibre Channel switching board 700 can be used in both the standard model and high performance model, replacement of the Fibre Channel switching board 700 and the system configuration change can easily be performed even at the time of the failure occurrence. Furthermore, because the Fibre Channel switching board 700 can be used in both the standard model and high performance model, there is no need for manufacturing and managing a Fibre Channel switching board for each model. Accordingly, the cost can be reduced.

What is claimed is:

1. A storage system comprising:
a management terminal for managing the configuration information of the storage system; and
wherein the control logical circuit manages, based on the combination of signal potentials of the connection confirmation signals output from the connect signal lines respectively connected to the controller boards, a plurality of models related to the connections between the controller boards and the FC switching boards,
wherein the plurality of models are a standard model where one controller board is connected to one FC switching board and a high performance model where a plurality of controller boards are connected to one FC switching board, and
wherein the configuration change from the standard model to the high performance model is performed such that:
the management terminal changes the controller board assigned to control a first disk drive connected to a first FC switch of the plurality of FC switches to a first controller board connected to the currently relevant FC switching board and changes the controller board assigned to control a second disk drive connected to a second FC switch of the plurality of FC switches from the first controller board to a currently non-connected second controller board,
the second controller board is connected to the FC switching board while the plurality of disk drives are in operation,
a first control circuit connected to the first controller board configures settings for the first FC switch to set the access target of the first controller board to the first disk drive, and
a second control circuit connected to the second controller board configures settings for the second FC switch to set the access target of the second controller board to the second disk drive.

2. The storage system according to claim 1, wherein the control logical circuit adjusts the control signal system between the controller boards and the disk drives according to combination of connections between the one or more controller boards and the one or more FC switching boards.

3. The storage system according to claim 2, wherein the control logical circuit determines whether one of the controller boards or a plurality of the controller boards is assigned to control the disk drives according to the combination of the connections between the one or more controller boards and the one or more FC switching boards.

4. The storage system according to claim 1,
wherein in the standard model, the signal potential output from a first connect signal line connected to the first controller board is managed so that it is at low level and the signal potential output from a second connect signal line connected to the second controller board is managed so that it is at high level, and
wherein in the high performance model, the signal potential output from the first and second connect signal lines is managed so that it is at low level.

5. A method for changing a configuration of a storage system, wherein the method comprises:
- wherein the control logical circuit manages, based on the combination of signal potentials of the connection confirmation signals output from the connect signal lines respectively connected to the controller boards, a plurality of models related to the connections between the controller boards and the FC switching boards,
- wherein the plurality of models are a standard model where one controller board is connected to one FC switching board and a high performance model where a plurality of controller boards are connected to one FC switching board, and wherein the configuration change from the standard model to the high performance model is performed such that:
- the management terminal changes the controller board assigned to control a first disk drive connected to a first FC switch of the plurality of FC switches to a first controller board connected to the currently relevant FC switching board and changes the controller board assigned to control a second disk drive connected to a second FC switch of the plurality of FC switches from the first controller board to a currently non-connected second controller board,
- the second controller board is connected to the FC switching board while the plurality of disk drives are in operation,
- a first control circuit connected to the first controller board configures settings for the first FC switch to set the access target of the first controller board to the first disk drive, and
- a second control circuit connected to the second controller board configures settings for the second FC switch to set the access target of the second controller board to the second disk drive.

6. The method for changing a configuration of a storage system according to claim 5, wherein the control signal system between the controller boards and the disk drives is adjusted according to the combination of connections between the one or more controller boards and the one or FC switching boards.

7. The method for changing a configuration of a storage system according to claim 6, wherein whether one of the controller boards or a plurality of the controller boards is assigned to control the plurality of the disk drives is determined according to the combination of connections between the one or more controller boards and the one or more FC switching board.

8. The method for changing a configuration of a storage system according to claim 5,
- wherein in the standard model, the signal potential output from a first connect signal line connected to the first controller board is managed so that it is at low level and the signal potential output from a second connect signal line connected to the second controller board is managed so that it is at high level, and
- wherein in the high performance model, the signal potential output from the first and second connect signal lines is managed so that it is at low level.

* * * * *